(No Model.)

J. A. RICHARDS.
BICYCLE.

No. 513,144. Patented Jan. 23, 1894.

Witnesses.
A. Ruppert
H. A. Daniels

Inventor:
John A. Richards
Per
Thomas P. Simpson
Atty.

THE NATIONAL LITHOGRAPHING COMPANY,
WASHINGTON, D. C.

UNITED STATES PATENT OFFICE.

JOHN A. RICHARDS, OF CAPON ROAD STATION, VIRGINIA.

BICYCLE.

SPECIFICATION forming part of Letters Patent No. 513,144, dated January 23, 1894.

Application filed April 8, 1893. Serial No. 469,583. (No model.)

*To all whom it may concern:*

Be it known that I, JOHN A. RICHARDS, a citizen of the United States, residing at Capon Road Station, in the county of Shenandoah and State of Virginia, have invented certain new and useful Improvements in Bicycles; and I do declare the following to be a full, clear, and exact description of the invention, such as will enable others skilled in the art to which it appertains to make and use the same, reference being had to the accompanying drawings, and to letters and figures of reference marked thereon, which form a part of this specification.

The special object of the invention is to make an improvement in bicycles whereby the power may be increased at the expense of the velocity to render easy the ascent of hills; whereby the rider may lounge along on levels with very little exertion; whereby he may coast down hill without any revolution of the pedals, and whereby he may combine power and velocity in speeding to go extraordinarily fast.

Figure 1:
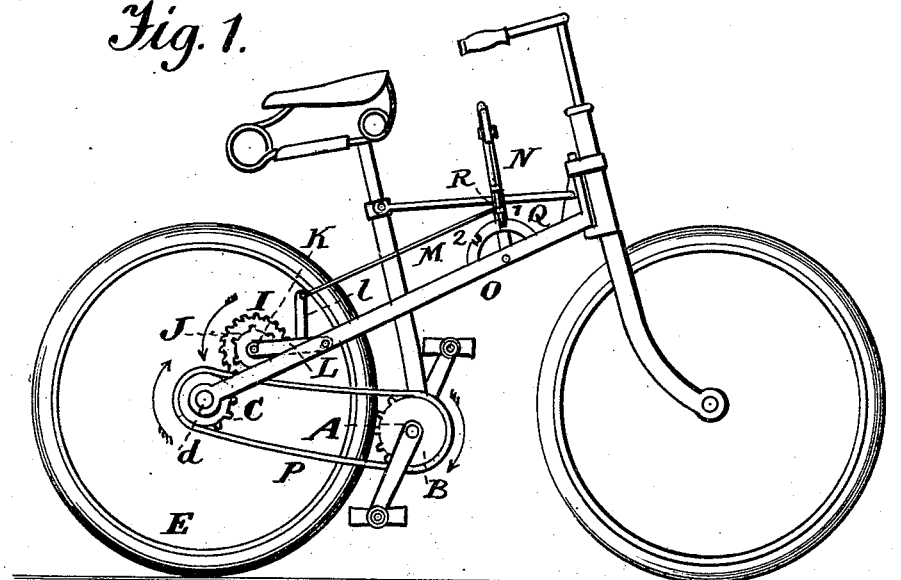
Figure 2:
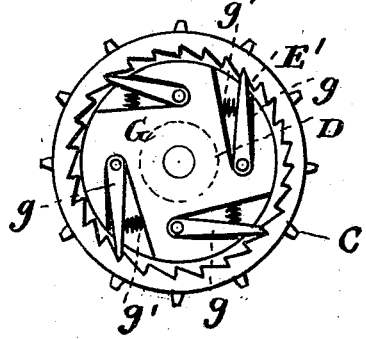
Figure 3:
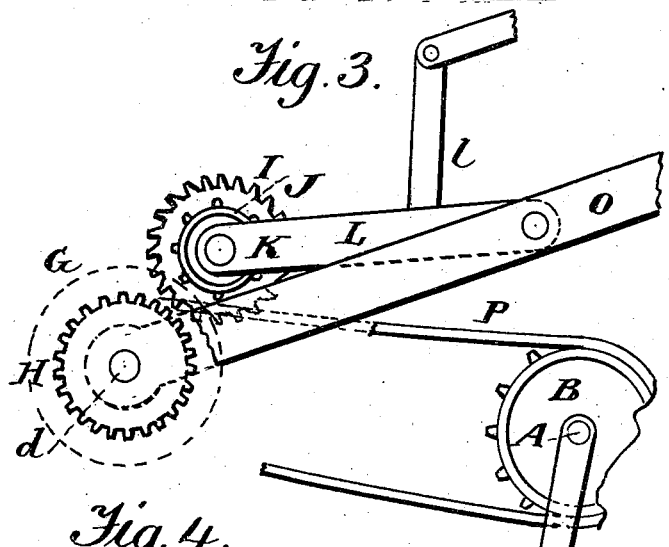
Figure 4:
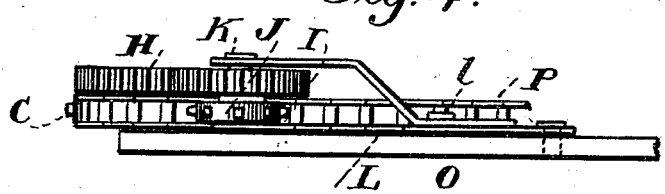

Figure 1 of the drawings is a side-elevation; Fig. 2 a detail view of the circular ratchet in the side of the rear sprocket wheel of a safety bicycle; Fig. 3 a detail view of the spur gear and auxiliary sprocket wheel; Fig. 4 a plan view of said spur gear and sprocket wheel.

In the drawings, A represents the crank-armed pedal shaft, B C the usual sprocket wheels connected by a sprocket-chain P, and D the hollow shaft which carries the rear wheel E around the spindle $d$. I preferably make the spurs on wheels B C as 4 to 3, so as to require but a small muscular power to operate the bicycle, especially up hill. However, I depart from the ordinary practice by making my rear sprocket wheel C loose and cause it to turn the shaft D and wheel E by means of its side-ratchet E' and the spring-pawls $g$ on a disk G which is fast on said shaft, the said pawls being pivoted in recesses of the disk and held to the ratchet teeth by the springs $g'$. The disk G is fast to a spur wheel H, both revolving with the shaft D and the wheel H gearing with the spur wheel I. The wheel I and sprocket wheel J are integral and fast on a shaft K which has its bearings in and between the arms of a lever L whose upright $l$ is connected by a pivoted rod M with the hand lever N. The lever N is pivoted to the backbone O on which is made fast the arc-shaped ratchet Q.

As shown in Fig. 1 of the drawings, the hand lever N holds the sprocket wheel J out of gear with the sprocket chain and the spur wheels ungeared so that a minimum of power is required and a minimum of speed obtained. By removing the spring pawl R out of notch 1 and into notch 2, the sprocket wheel J gears with the upper side of the sprocket chain so as to be carried in an opposite direction therefrom. The spur wheels being also brought into gear, the shaft D and ground wheel are revolved at a maximum speed for a given number of revolutions of the pedal shaft.

In coasting, the rider holds the pedals still with his feet, while the pawl disk G revolves with the shaft D in the ratchet wheel E' as the gravity and momentum carry the wheel down hill.

I preferably make the sprocket wheels B J in diameter as four to one and one-half this being found in practice to permit extraordinary speed.

Having thus described all that is necessary to a full understanding of my invention, what I claim as new, and desire to protect by Letters Patent, is—

The combination with the pedal shaft and sprocket wheels B C connected by the sprocket-chain P, of the auxiliary sprocket wheel J and integral spur wheel H arranged in bearings of a bifurcated lever L, movable to engage or disengage the wheels I J with the spur wheel H and sprocket chain P respectively and the rotary shaft D carrying fast spur wheel I, whereby the wheel E may be rotated as and for the purpose set forth.

In testimony whereof I affix my signature in presence of two witnesses.

JOHN A. RICHARDS.

Witnesses:
 A. RUPPERT,
 CHAS. L. DUBOIS.